(12) United States Patent
Tsai et al.

(10) Patent No.: US 8,294,692 B2
(45) Date of Patent: Oct. 23, 2012

(54) OPTICAL TOUCH SENSING APPARATUS

(75) Inventors: Wen-Ji Tsai, Sinjhuang (TW); Bo-Ren Yan, Taichung County (TW); Jung-Wen Chang, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 814 days.

(21) Appl. No.: 12/475,801

(22) Filed: Jun. 1, 2009

(65) Prior Publication Data
US 2010/0194711 A1 Aug. 5, 2010

(30) Foreign Application Priority Data
Feb. 5, 2009 (TW) .............................. 98201728 U

(51) Int. Cl.
*G09G 3/00* (2006.01)
(52) U.S. Cl. ..................................... 345/175; 178/18.09
(58) Field of Classification Search .................. 345/173, 345/175; 178/18.03, 18.09
See application file for complete search history.

(56) References Cited

U.S. PATENT DOCUMENTS

| 4,703,316 | A | 10/1987 | Sherbeck |
| 4,812,830 | A | 3/1989 | Doering |
| 6,803,906 | B1 * | 10/2004 | Morrison et al. ............. 345/173 |
| 6,828,959 | B2 | 12/2004 | Takekawa et al. |
| 6,948,371 | B2 * | 9/2005 | Tanaka et al. ................. 345/173 |
| 2006/0050059 | A1 * | 3/2006 | Satoh et al. ................... 345/173 |

* cited by examiner

*Primary Examiner* — Regina Liang
(74) *Attorney, Agent, or Firm* — Thomas, Kayden, Horstemeyer & Risley, LLP

(57) ABSTRACT

The invention discloses an optical touch sensing apparatus applied to a panel. The optical touch sensing apparatus comprises an frame, a first image capturing module, a second image capturing module, and a processing module. The first image capturing module is set at a first position for capturing a first image corresponding to a touch point on the panel; the second image capturing module is set at a second position for capturing a second image corresponding to the touch point. The processing module is used for determining a coordinate of the touch point according to the first image and the second image.

18 Claims, 6 Drawing Sheets

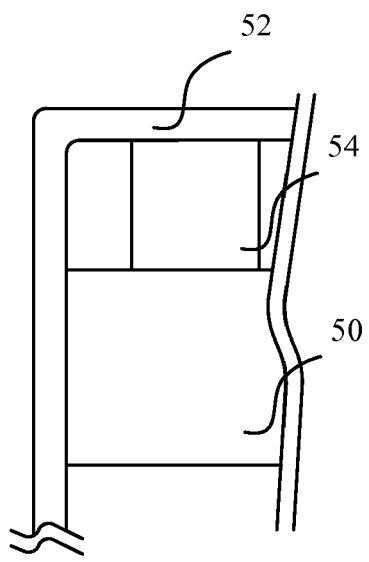 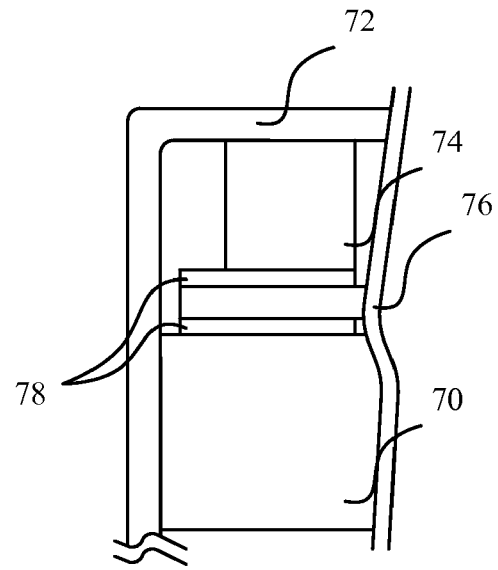
FIG. 6A                     FIG. 6B

OPTICAL TOUCH SENSING APPARATUS

CROSS-REFERENCE TO RELATED APPLICATION

This utility application claims priority to Taiwan Application Serial Number 098201728, filed Feb. 5, 2009, which is incorporated herein by reference.

BACKGROUND OF THE INVENTION

1. Field of the Invention

The present invention generally relates to an optical touch sensing apparatus, and more particularly, the optical touch sensing apparatus of the invention comprises a frame that covers the panel.

2. Description of the Prior Art

In recent years, with the vigorous development of the image display technology, the touch panel can be directly input by touching, and the touch panel has already become a popular display apparatus on the market which is widely used in various electric products, for example, an automatic teller machine (ATM), a point of sale (POS) terminal, a customer tour system, or an industrial controlling system, etc.

The products of optical lens sensing touch panel are limited by the size of the conventional adjusting mechanism, so that the sensing touch panel needs a larger designed space. Please refer to FIG. 1. FIG. 1 illustrates the conventional optical sensing touch monitor. The conventional optical sensing touch monitor includes a panel 10, a first image module 12, a second image module 14, a plurality of lighting units 16, and a processing unit (not shown in the figure).

As shown in FIG. 1, at least two additional image modules 12 and 14 for capturing need to be installed upon the panel 10, and a plurality of lighting units 16 need to be installed around the panel 10, so that the panel 10 can have a touch control function. In this way, the processing unit can calculate a coordinate of the touch point P1 according to the first image detected by the first image module 12 and the second image detected by the second image module 14, respectively. However, the conventional electronic components of the image capturing modules 12, 14 and the lighting unit 16 are exposed outside the touch panel to sense the touch points, so that the thickness of the panel is increased because of the image modules 12, 14 and the lighting unit 16. Not only is it inconvenient for the user, but it is also not attractive in appearance.

Additionally, if a glass layer is added to the conventional optical sensing touch monitor as a protecting layer, a re-designed mechanical structure related to that function is needed, and this will not only obviously increase the designing time, but also increase the complexity of fabricating the mechanism of the touch panel.

Therefore, the present invention provides an optical touch sensing apparatus to solve the problems mentioned above.

SUMMARY OF THE INVENTION

According to an embodiment of the invention, the optical touch sensing apparatus is applied to a panel. The optical touch sensing apparatus comprises an frame, a first image capturing module, a second image capturing module, and a processing module.

In this embodiment, the frame comprises a first position and a second position. The first image capturing module is located on the first position, and is used for capturing a first image corresponding to a touch point on the panel; the second image capturing module is located on the second position for capturing a second image corresponding to the touch point on the panel. The processing module is coupled to the first image capturing module and the second image capturing module for determining a coordinate of the touch point according to the first image and the second image.

Compared to the prior art, the feature of the invention is to directly install the image capturing module on the frame of the panel, and to integrate the related circuit components of the image capturing module on the frame to form the optical touch sensing apparatus whose function is totally independent to the panel. Additionally, the related circuits of the image capturing module are hidden inside the frame, so that the frame can properly protect the image capturing module and circuits from being hit by an external force. Moreover, since the circuit board of the image capturing module and the image sensor of the image capturing module are separately located, the thickness of the optical touch sensing apparatus can be effectively decreased.

And, since the frame is made by metal, the frame can generate a shielding effect to effectively protect the panel from the environmental electromagnetic interference (EMI) to increase the stability of the signal. Because the optical touch sensing apparatus of the invention is fully separated with the panel, therefore, users can optionally determine whether a protecting layer of a glass will be added on the outside of the panel according to his/her practical needs. On the other hand, the optical touch sensing apparatus of the invention can also simplify the complexity of fabricating the mechanism of the conventional touch panel, and the space needed for fabricating the conventional touch panel can also be effectively decreased at the same time.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 6 illustrates a drawing of the optical touch sensing apparatus covering the panel of a second embodiment of the invention.

DETAILED DESCRIPTION OF THE INVENTION

Figure 1:
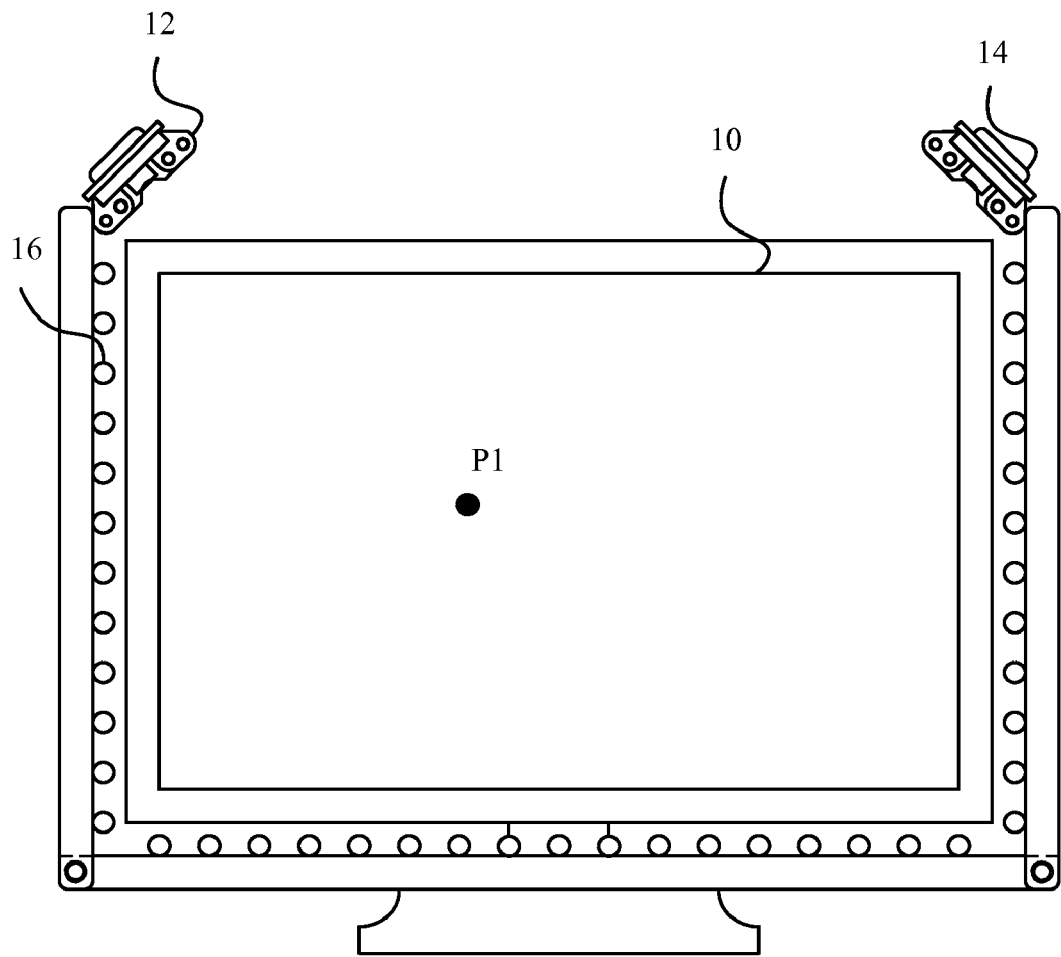
FIG. 1 illustrates the conventional optical lens sensing touch panel.
Figure 2:
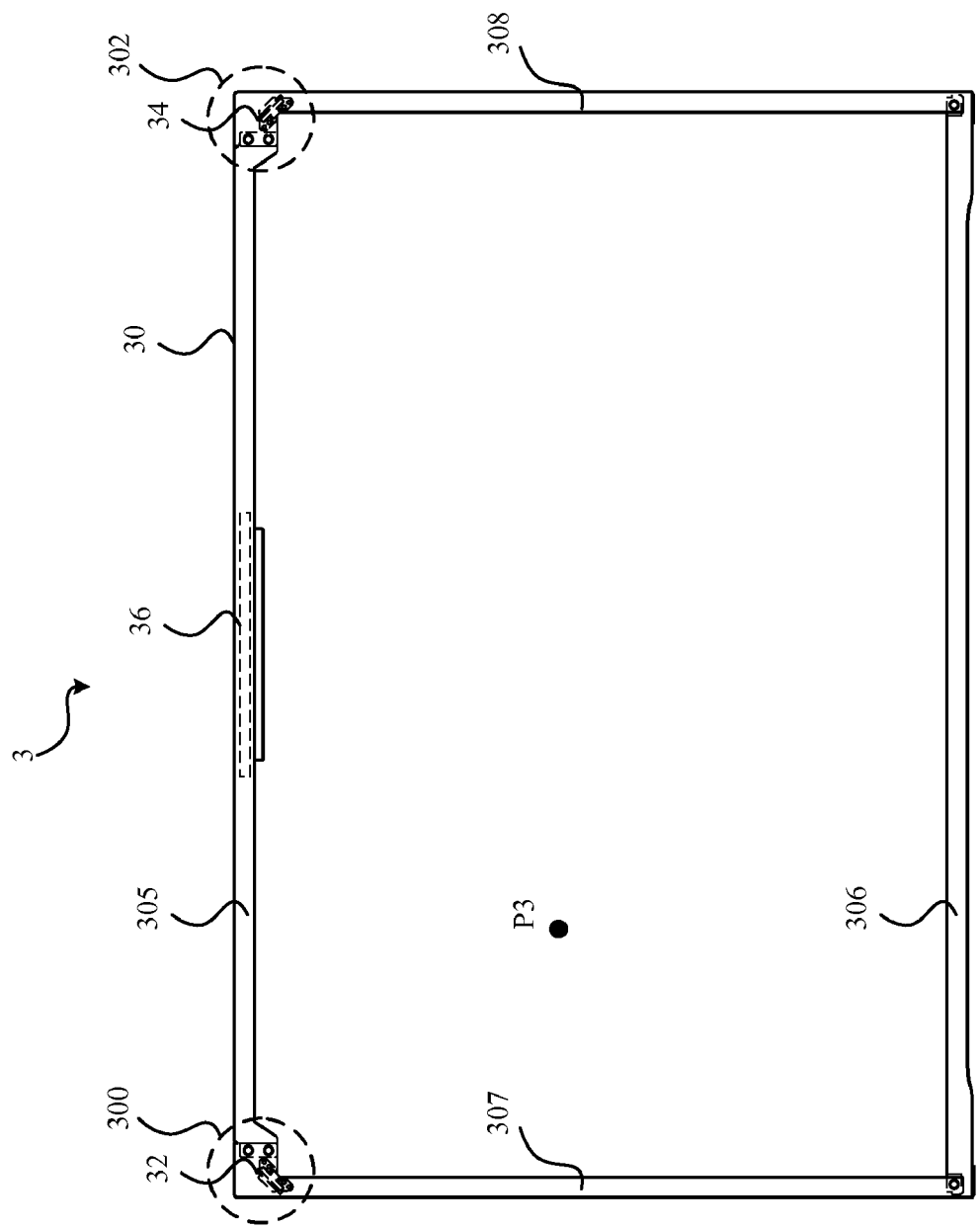
FIG. 2 illustrates the front view of the optical touch sensing apparatus of a first embodiment of the invention.

Please refer to FIG. 2. FIG. 2 illustrates the front view of the optical touch sensing apparatus 3 of a first embodiment of the invention. As shown in FIG. 2, the optical touch sensing apparatus 3 includes a frame 30, a first image capturing module 32, a second image capturing module 34, and a processing module 36. Next, each module of the optical touch sensing apparatus 3 will be respectively introduced in detail as follows.

Firstly, the frame 30 of the optical touch sensing apparatus 3 is introduced. The frame 30, which can cover the panel, includes a first position 300 and a second position 302 for the image capturing modules to be located. In this embodiment, the first position 300 and the second position 302 are located on the upper left side and the upper right side of the frame 30 respectively. Of course, in practical applications, the first position 300 and the second position 302 can also be located on other suitable positions of the frame 30 based on practical needs, and not limited to this embodiment. In general, the frame 30 is usually made of metallic material, so that the frame 30 can protect the inner circuits and shield the EMI.

The optical touch sensing apparatus 3 includes two image capturing modules, wherein the first image capturing module 32 is located on the first position 300 of the frame 30, and it is used for capturing a first image corresponding to a touch point P3; the second image capturing module 34 is located on the second position 302 of the frame 30, and it is used for capturing a second image corresponding to the touch point P3. And, the processing module 36 is hidden inside the frame 30, and it is coupled to the first image capturing module 32 and the second image capturing module 34. The processing module 36 is used for determining a coordinate of the touch point P3 according to the first image and the second image.

Figure 3:
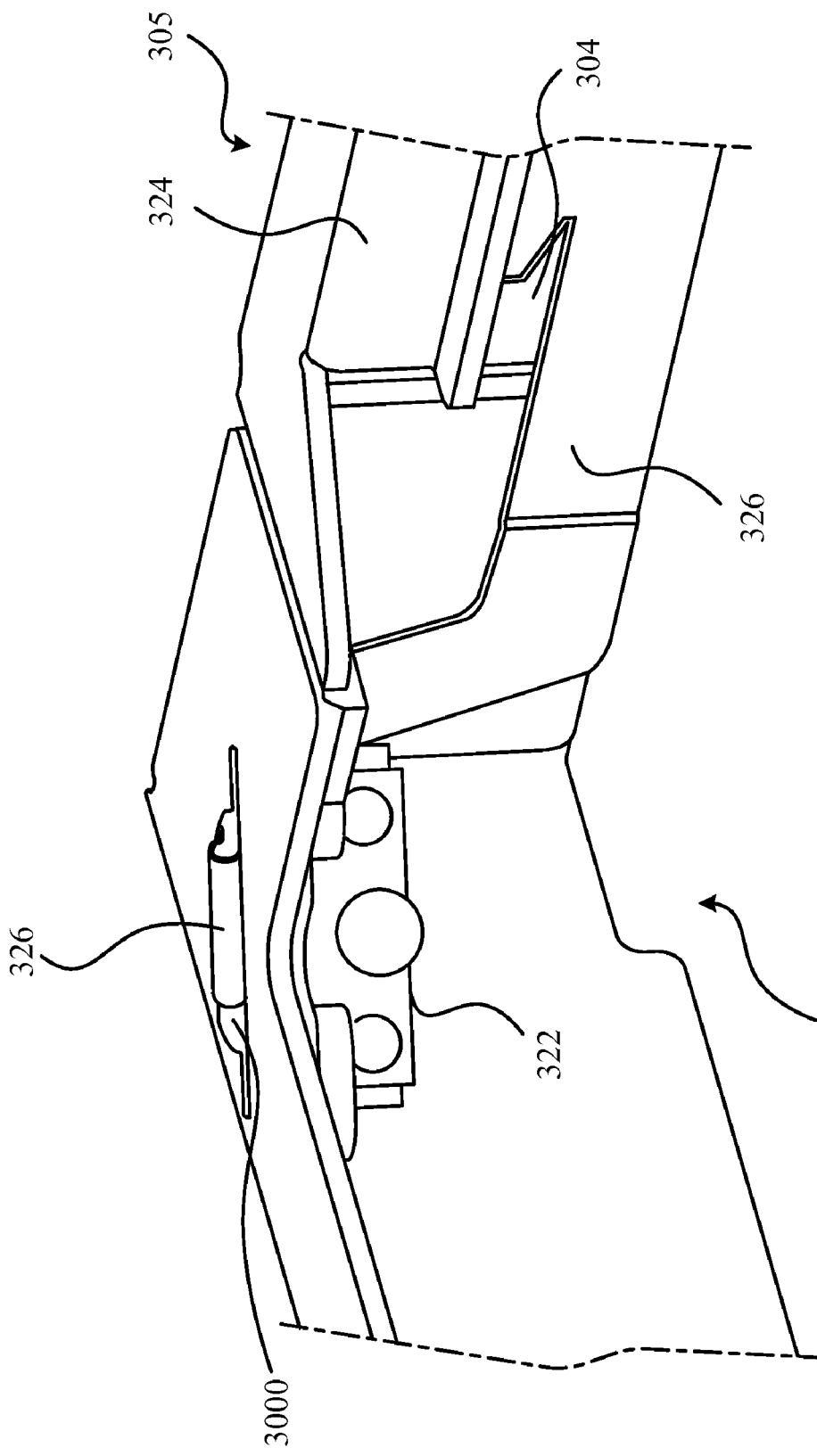
FIG. 3 illustrates a partial enlarged diagram of the first position of the optical touch sensing apparatus in FIG. 2.

In this embodiment, please refer to FIG. 3, both the first image capturing module 32 and the second image capturing module 34 include a circuit board 324 and a image sensor 322, wherein the image sensor 322 can comprise a charge-coupled device (CCD) image sensor, a complementary metal-oxide-semiconductor (CMOS) image sensor or other types of image sensors, it has no specific limitation.

Please refer to FIG. 3. FIG. 3 illustrates a partial enlarged diagram of the first position 300 of the optical touch sensing apparatus 3 in FIG. 2. As shown in FIG. 3, the frame 30 also includes a first cable hole 3000 and a second cable hole (not shown in the figure). In this embodiment, the first cable hole 3000 is located near the first position 300, and is used for providing a space to receive a portion of a first cable 326 of the first image capturing module 32; the second cable hole is located near the second position 302, and is used for providing a space to receive a portion of a second cable of the second image capturing module 34.

In practical applications, the first cable hole 3000 and the second cable hole are located on the upper of the first image capturing module 32 and the second image capturing module 34, respectively. In general, for better balance and attractiveness, the corresponding position that the second cable hole is located on the second position 302 and the corresponding position that the first cable hole 3000 is located on the first position 300 are approximately the same, so that the imbalance can be avoided.

Please refer to FIG. 2 again. In this embodiment, a first metal member 305, a second metal member 306, a third metal member 307, and a fourth metal member 308 are connected or riveted to form the frame 30, wherein the first metal member 305, the second metal member 306, the third metal member 307, and the fourth metal member 308 are located on the upper side, lower side, left side, and right side of the frame 30, respectively. In practical applications, the material and the number of the metal members of the frame 30 have no specific limitation, therefore, it is not limited to the frame 30 formed by the four metal members in this embodiment.

A passage 304 or a recess is located on the inner side of the first metal member 305, and the passage 304 is located between the first position 300 and the second position 302, when the passage 304 is used for hiding the processing module 36 and related cables/modules (e.g., a power circuit board), so that they will not be exposed outside. The cable is used for coupling the processing module 36 with the first image capturing module 32 and the second image capturing module 34.

In practical applications, in order to decrease the thickness of the first image capturing module 32 and the second image capturing module 34, the circuit board 324 and the image sensor 322 of the first image capturing module 32 and the second image capturing module 34 can be separately located, the circuit board 324 and the image sensor 322 are electrically connected by trace or cables (e.g., a flexible printed circuit (FPC) or a flexible flat cable (FFC)); in fact, the circuit board 324 of the first image capturing module 32 is located in the passage 304 near the first position 300, and the first cable 326 is used for electrically connecting the image sensor 322 and the circuit board 324 of the first image capturing module 32. The circuit board of the second image capturing module 34 is located in the passage 304 near the second position 302; the second cable is used for electrically connecting the image sensor and the circuit board of the second image capturing module 34. The power circuit board is coupled to the circuit boards 324 for stably providing power to the first image capturing module 32 and the second capturing module 34 respectively. Additionally, the power circuit board and the circuit boards 324 can also be integrated into single circuit board and hidden in the passage 304 of the first metal member 305.

Figure 4:
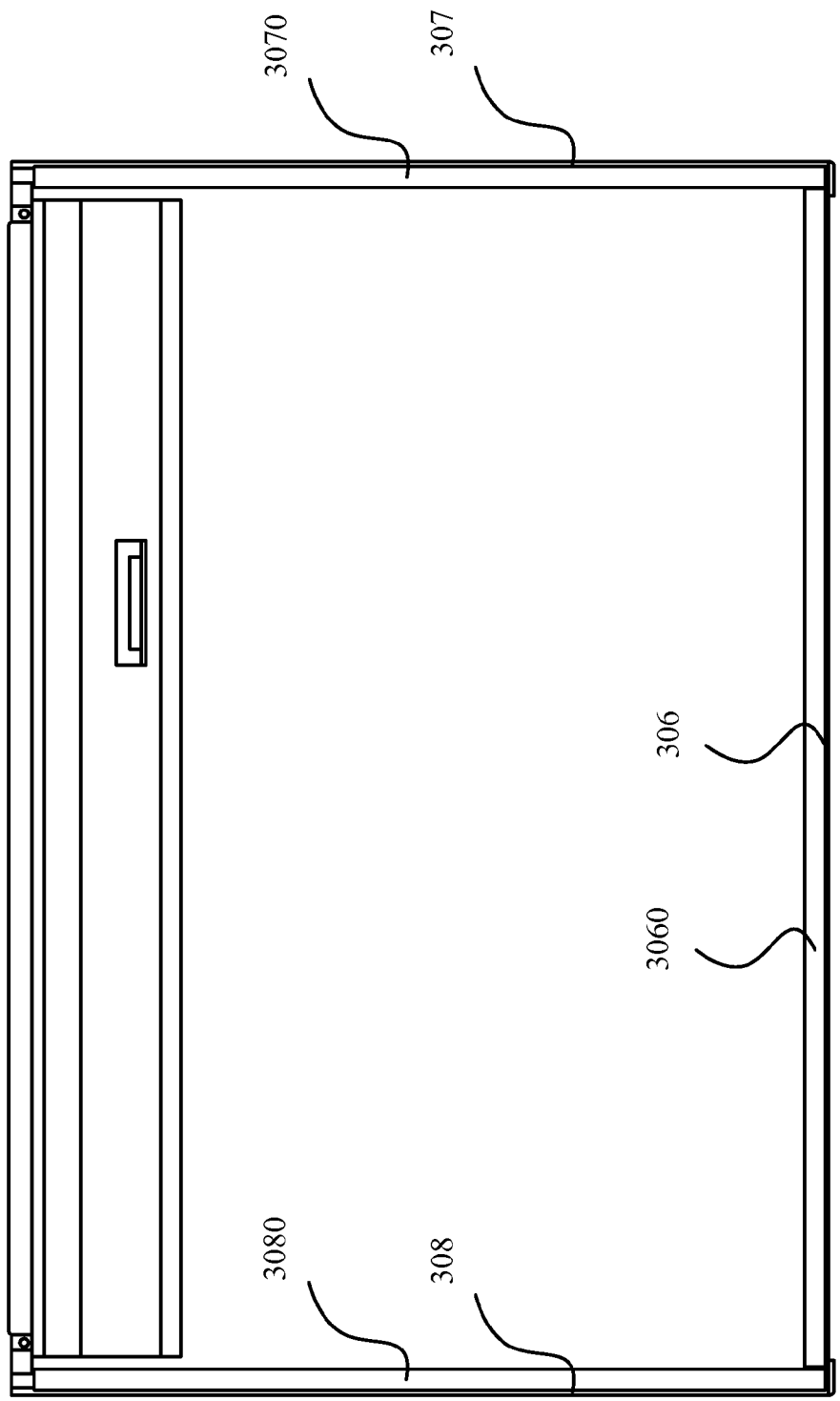
FIG. 4 illustrates a back view of the optic touch sensing apparatus in FIG. 2.

Please refer to FIG. 4. FIG. 4 illustrates a back view of the optical touch sensing apparatus 3 shown in FIG. 2. As shown in FIG. 4, a lower side strip 3060 can be selectively located on the inside of the second metal member 306. In practical applications, the lower side strip 3060 can be formed by a single spectrum light-transmitting material (e.g., the material permeated only by an infrared and other color lights will be filtered), a light-mixing material with a mixed effect or a retro-reflective material, but not limited to these. The strip 3060 is used to mix the lights of the light units, so that the separated light units (the dispersed single lighting) can be regarded as a continuous line lighting source or plane lighting source for the optical touch sensing apparatus 3, so that the optical touch sensing apparatus 3 can calculate the coordinate of the touch point more accurately.

Similarly, a left side strip 3070 can be selectively located on the inside of the third metal member 307, and the material of the left side strip 3070 is substantially the same with that of the lower side strip 3060; a right side strip 3080 can be selectively located on the inside of the fourth metal member 308, and the material of the right side strip 3080 is substantially the same with that of the lower side strip 3060. In practical applications, the material of the strips can be selected according to the user's needs with no specific limitations.

Figure 5:
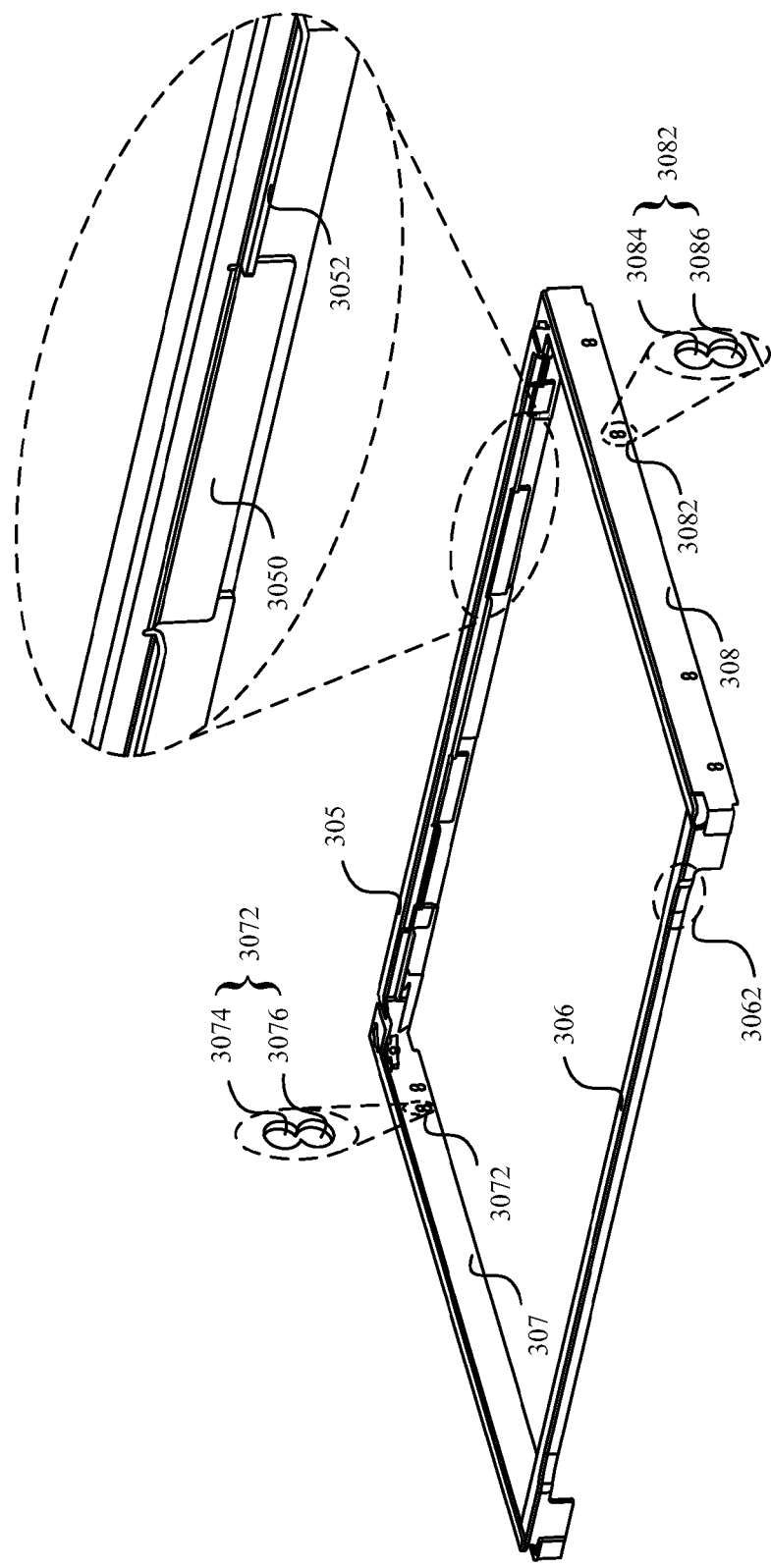
FIG. 5 illustrates a partial enlarged diagram and a lateral view of the optical touch sensing apparatus in FIG. 2.

Please refer to FIG. 5. FIG. 5 illustrates a lateral view and a partially enlarged diagram of the optical touch sensing apparatus 3 shown in FIG. 2. The partial enlarged diagram is shown in the upper right of FIG. 5, the first metal member 305 includes a first lateral supporting structure 3050 and a first normal supporting structure 3052. When the frame 30 covers the panel, the first lateral supporting structure 3050 is used for laterally supporting the panel and the first normal supporting structure 3052 is used for normally supporting the panel.

Similarly, the second metal member 306 also includes a second lateral supporting structure (not shown in the figure) and a second normal supporting structure (not shown in the figure). In fact, the functions of the second lateral supporting structure and the first lateral supporting structure are the same; and the functions of the second normal supporting structure and the first normal supporting structure are the same. Therefore, it is not to be repeatedly described herein.

In practical applications, the second metal member 306 can further include a step structure 3062. The step structure 3062 is mainly used for assisting the second lateral supporting structure and the second normal supporting structure to limit the lateral shift and the normal shift of the panel. Additionally, the third metal member 307 and the fourth metal member 308 can be engaged into the side wall of the panel to directly limit the lateral movement of the panel, so that the shaking of the panel can be effectively avoided.

As shown in the partial enlarged diagrams in the lower right side and the upper left side of FIG. 5, a left side 8-shaped hole 3072 is located upon the third metal member 307, and the left side 8-shaped hole 3072 further comprises a first left side hole 3074 and a second left side hole 3076. Similarly, a right side 8-shaped hole 3082 corresponding to the left side 8-shaped hole 3072 is located upon the fourth metal member 308, and the 8-shaped hole 3082 on the right side comprises a first right side hole 3084 and a second right side hole 3086. And, the position of the first left side hole 3074 of the 8-shaped hole 3072 corresponds to that of the first right side hole 3084 of the 8-shaped hole 3082; the position of the second left side hole 3076 of the 8-shaped hole 3072 corresponds to that of the second right side hole 3086 of the right side 8-shaped hole 3082.

It is notable that the purpose of using the above design in this invention is to provide different locking holes, so that the user can select whether a protecting layer of a glass is added to the outside of the panel according to his/her practical needs by using different locking holes to lock. Therefore, the user can flexibly use the optical touch sensing apparatus 3, and the complexity of the designed structure of the optical touch sensing apparatus 3 can be substantially decreased.

Additionally, the corresponding 8-shaped holes can be also located on the first metal member 305 and the second metal member 306 to enhance the locking strength of the panel. Similarly, the 8-shaped holes can also have two corresponding holes respectively. The locking holes corresponding to each of the 8-shaped holes are located on the panel itself, when they are assembled, a screw can be used to directly penetrate through the 8-shaped hole to form a locking state with the lock hole of the panel, but it is not limited to this.

Please refer to FIG. 6A. FIG. 6A illustrates a drawing of the optical touch sensing apparatus covering the panel of a second embodiment of the invention. As shown in FIG. 6A, the frame 52 of the optical touch sensing apparatus covers the panel 50, and a strip 54 is located between the panel 50 and the frame 52. In fact, the strip 54 can be formed by a single spectrum light-transmitting material, a light-mixing material, or a retro-reflective material, but not limited to these. Please refer to FIG. 5 again. If the frame 52 covers the panel 50, the panel 50 will be locked on the first left side hole 3074 and the first right side hole 3084, but not limited to this.

In fact, a glass member can be further located on the inside of the frame of the optical touch sensing apparatus according to user's needs to form an optical touch sensing apparatus comprising a glass layer. Please refer to FIG. 6B, FIG. 6B illustrates a drawing of the optical touch sensing apparatus covers the panel of a third embodiment of the invention. As shown in FIG. 6B, if the frame 72 covers the panel 70, the glass member 76 will be located on the outside of the panel 70 to protect the panel 70, the strip 74 is located between the frame 72 and the glass member 76.

Additionally, a cushion such as foam 78 is located between the panel 70 and the glass member 78, so that the hitting or the friction between the panel 70 and the glass member 78 can be avoided; the cushioning foam 78 can also be located between the glass member 76 and the strip 74, so that the hitting or the friction between the glass member 76 and strip 74 can be avoided.

Please refer to FIG. 5 again. When the optical touch sensing apparatus with the glass layer covers the panel 70, the panel 70 will be locked on the second left side hole 3076 and the second right side hole 3086 shown in FIG. 5 by a screw, but not limited to this.

Compared to the prior art, the feature of the invention is to directly install the image capturing module on the frame of the panel, and to integrate the related circuit components of the image capturing module on the frame to form the optical touch sensing apparatus whose function is totally independent to the panel. Additionally, the related circuits of the image capturing module are hidden inside the frame, so that the frame can properly protect the image capturing module and circuits from being hit by an external force. Moreover, since the circuit board of the image capturing module and the image sensor of the image capturing module are separately located, the thickness of the optical touch sensing apparatus can be effectively decreased.

And, since the frame is made by metal, the frame can generate a shielding effect to effectively protect the panel from the environmental EMI to increase the stability of the signal. Because the optical touch sensing apparatus of the invention is fully separated with the panel, therefore, users can optionally determine whether a protecting layer of a glass is added on the outside of the panel according to his/her practical needs. On the other hand, the optical touch sensing apparatus of the invention can also simplify the complexity of fabricating the mechanism of the conventional touch panel, and the space needed for fabricating the conventional touch panel can also be effectively decreased at the same time.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch sensing apparatus applied to a panel, the optical touch sensing apparatus comprising:
   a frame for covering the panel, the frame comprising a first position and a second position;
   a first image capturing module, located on the first position, for capturing a first image corresponding to a touch point on the panel;
   a second image capturing module, located on the second position, for capturing a second image corresponding to the touch point on the panel; and
   a processing module coupled to the first image capturing module and the second image capturing module for determining a coordinate of the touch point according to the first image and the second image, wherein the frame is formed by a first metal member, a second metal member, a third metal member, and a fourth metal member, the first metal member, the second metal member, the third metal member and the fourth metal member are located on the upper side, lower side, left side and right side of the frame respectively, and a left side 8-shaped hole is located upon the third metal member, the left side 8-shaped hole comprises a first left side hole and a second left side hole, a right side 8-shaped hole is located upon the fourth metal member, the right side 8-shaped hole comprises a first right side hole and a second right side hole.

2. The optical touch sensing apparatus of claim 1, wherein the first position and the second position are located on the upper left side and the upper right side of the frame respectively.

3. The optical touch sensing apparatus of claim 1, wherein the frame comprises:
   a first cable hole located near the first position for providing a space for receive a portion of a first cable of the first image capturing module; and
   a second cable hole located near the second position for providing a space for receive a portion a second cable of the second image capturing module.

4. The optical touch sensing apparatus of claim 1, wherein a passage is provided on the inner side of the first metal member, the passage is located between the first position and the second position, and the passage is used for hiding the processing module and a cable, the processing module is coupled to the first image capturing module and the second image capturing module via the cable.

5. The optical touch sensing apparatus of claim 4, wherein the first image capturing module comprises a first image sensor and a first circuit board, the second image capturing module comprises a second image sensor and a second circuit board, the first circuit board and the second circuit board are located in the passage.

6. The optical touch sensing apparatus of claim 5, wherein the first image sensor is electrically connected with the first circuit board through a first cable, the second image sensor is electrically connected with the second circuit board through a second cable.

7. The optical touch sensing apparatus of claim 6, wherein both the first cable and the second cable comprise a flexible flat cable (FFC).

8. The optical touch sensing apparatus of claim 5, wherein both the first image sensor and the second image sensor are selected from the group consisting of a CCD sensor and a CMOS sensor.

9. The optical touch sensing apparatus of claim 1, wherein a lower side strip is located on the inner side of the second metal member, the lower side strip is formed by a single spectrum light-transmitting material, a light-mixing material, or a retro-reflective material.

10. The optical touch sensing apparatus of claim 1, wherein a left side strip is located on the inner side of the third metal member, the left side strip is formed by a single spectrum light-transmitting material, a light-mixing material, or a retro-reflective material.

11. The optical touch sensing apparatus of claim 1, wherein a right side strip is located on the inner side of the fourth metal member, the right side strip is formed by a single spectrum light-transmitting material, a light-mixing material, or a retro-reflective material.

12. The optical touch sensing apparatus of claim 1, wherein the first metal member comprises:
   a first lateral supporting structure for laterally supporting the panel; and
   a first normal supporting structure for normally supporting the panel.

13. The optical touch sensing apparatus of claim 1, wherein the second metal member comprises:
   a second lateral supporting structure for laterally supporting the panel; and
   a second normal supporting structure for normally supports the panel.

14. The optical touch sensing apparatus of claim 13, wherein the second metal member further comprises:
   a step structure for assisting the second lateral supporting structure and the second normal supporting structure to limit the lateral shift and the normal shift of the panel.

15. The optical touch sensing apparatus of claim 1, wherein the third metal member and the fourth metal member are engaged into the side wall of the panel to directly limit the lateral movement of the panel.

16. The optical touch sensing apparatus of claim 1, wherein the first left side hole of the left side 8-shaped hole corresponds to the first right side hole of the right side 8-shaped hole, the second left side hole of the left side 8-shaped hole corresponds to the second right side hole of the right side 8-shaped hole.

17. The optical touch sensing apparatus of claim 1, further comprising:
   a glass member, located on the inside of the frame, wherein when the frame covers the panel, the glass member being located on the outside of the panel to protect the panel, at this time, the panel being locked on the second left hole and the second right hole.

18. The optical touch sensing apparatus of claim 17, wherein a cushion is located between the panel and the glass member.

* * * * *